(12) United States Patent
Gurusami et al.

(10) Patent No.: US 6,963,697 B2
(45) Date of Patent: **\*Nov. 8, 2005**

(54) INCREASED TRANSMISSION CAPACITY FOR A FIBER-OPTIC LINK

(75) Inventors: Aravanan Gurusami, Wallingford, CT (US); Joseph F. Chiappetta, Shelton, CT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 50 days.

This patent is subject to a terminal disclaimer.

(21) Appl. No.: 10/696,025

(22) Filed: Oct. 29, 2003

(65) Prior Publication Data

US 2005/0147418 A1 Jul. 7, 2005

Related U.S. Application Data

(62) Division of application No. 09/824,433, filed on Apr. 2, 2001, now Pat. No. 6,643,471.

(51) Int. Cl.[7] ............................................. H04B 10/06
(52) U.S. Cl. .................... 398/202; 398/189; 398/182; 398/183; 398/190; 398/200; 398/206; 398/208; 398/209; 398/213; 398/214; 398/141; 398/154; 375/286; 375/287; 375/353; 375/316; 375/320; 375/324
(58) Field of Search .................. 398/202, 189, 398/182, 183, 190, 200, 141, 154, 206, 208, 398/209, 213, 214; 375/353, 268, 320, 286, 375/316, 324, 287

(56) References Cited

U.S. PATENT DOCUMENTS

| | | |
|---|---|---|
| 4,426,662 A | 1/1984 | Skerlos et al. |
| 5,008,957 A | 4/1991 | Kiyono |
| 5,222,103 A | 6/1993 | Gross |
| 5,408,500 A | 4/1995 | Ginzburg et al. |
| 5,510,919 A * | 4/1996 | Wedding ..................... 398/141 |
| 5,543,952 A | 8/1996 | Yonenaga et al. |
| 5,867,534 A | 2/1999 | Price et al. |
| 5,892,858 A | 4/1999 | Vaziri et al. |
| 5,917,638 A | 6/1999 | Franck et al. |
| 5,917,642 A | 6/1999 | O'Donnell et al. |
| 5,920,416 A | 7/1999 | Beylat et al. |
| 5,999,297 A | 12/1999 | Penninckx |
| 5,999,300 A | 12/1999 | Davies et al. |
| 6,002,816 A | 12/1999 | Penninckx et al. |
| 6,097,525 A | 8/2000 | Ono et al. |
| 6,158,041 A | 12/2000 | Raleigh et al. |
| 6,185,259 B1 | 2/2001 | Dent |
| 6,188,497 B1 | 2/2001 | Franck et al. |
| 6,212,230 B1 | 4/2001 | Rybicki et al. |

(Continued)

FOREIGN PATENT DOCUMENTS

EP    1 026 863 A2    8/2000

(Continued)

*Primary Examiner*—Hanh Phan
(74) *Attorney, Agent, or Firm*—Fogg and Associates, LLC; Scott V. Lundberg

(57) ABSTRACT

A method of decoding a signal in an optical fiber. In one embodiment the method includes receiving the optical signal, wherein the optical signal is a pulse amplitude modulated signal. Converting the optical signal to an electrical signal. Comparing the electrical signal with a plurality of levels. Producing comparison output signals based on the comparison of the electrical signal with the plurality of levels. Processing the comparison output signals on a clock to produce processed output signals and latching the processed output signals on a clock signal to generate the plurality of serial, digital data streams.

12 Claims, 5 Drawing Sheets

U.S. PATENT DOCUMENTS

| | | |
|---|---|---|
| 6,212,654 B1 | 4/2001 | Lou et al. |
| 6,289,055 B1 * | 9/2001 | Knotz ..................... 375/286 |
| 6,304,357 B1 | 10/2001 | Ohhata et al. |
| 6,320,688 B1 | 11/2001 | Westbrook et al. |
| 6,337,756 B1 | 1/2002 | Djupsjobacka |
| 6,362,913 B2 | 3/2002 | Ooi et al. |
| 6,373,903 B1 | 4/2002 | Wynn |
| 6,388,786 B1 | 5/2002 | Ono et al. |
| 6,445,476 B1 | 9/2002 | Kahn et al. |
| 6,643,471 B2 * | 11/2003 | Gurusami et al. .......... 398/189 |

FOREIGN PATENT DOCUMENTS

| | | |
|---|---|---|
| WO | 99/09682 | 2/1999 |

* cited by examiner

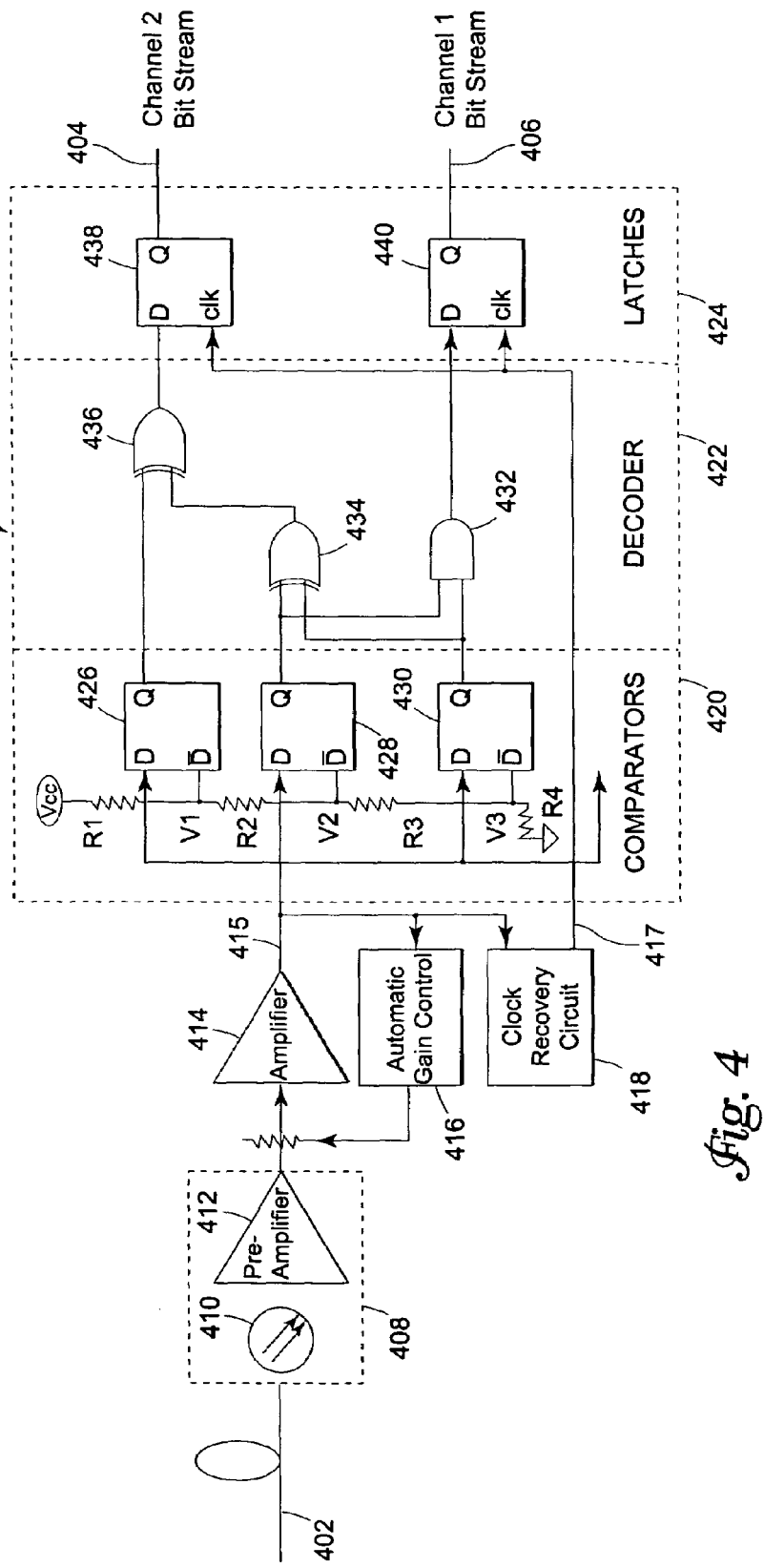
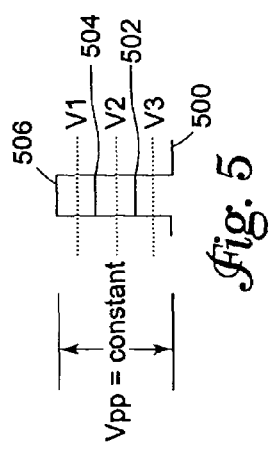
Fig. 4
Fig. 5

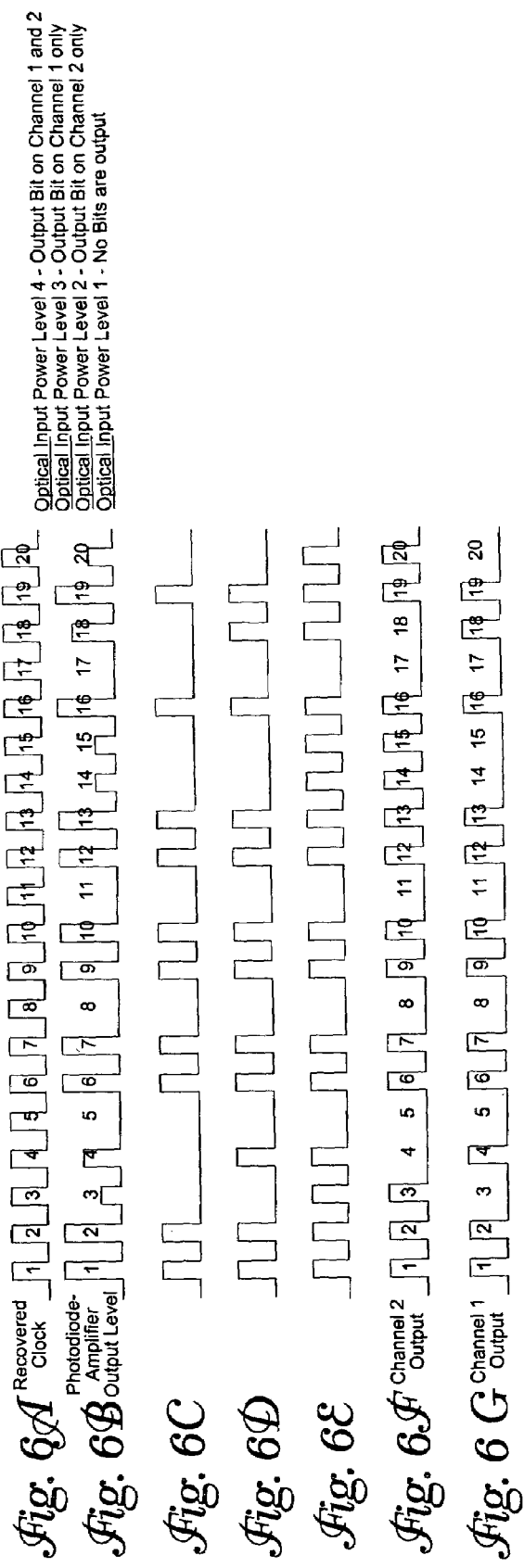

INCREASED TRANSMISSION CAPACITY FOR A FIBER-OPTIC LINK

This application is a divisional of U.S. application Ser. No. 09/824,433, filed Apr. 2, 2001, now U.S. Pat. No. 6,643,471 entitled "Increased Transmission Capacity for a Fiber-Optic Link", which is incorporated herein by reference.

TECHNICAL FIELD

The present invention relates generally to the field of telecommunications and, in particular, to increased transmission capacity for a fiber-optic link.

BACKGROUND

Telecommunications systems transmit data, e.g., voice video and other data, between equipment at various locations. This equipment includes user equipment, access equipment, switches, and other conventional telecommunications equipment. Telecommunications systems typically include a variety of transmission medium to transmit data to and from the equipment. For example, some systems transmit data over one or more of coaxial cables, fiber optic cables, or other appropriate medium.

Over time, service providers increase the capacity of their systems to keep up with an ever-increasing demand for access to the system. One typical technique for increasing the capacity of the system is to increase the speed at which data is transmitted over the system. Unfortunately, when fiber-optic cables are used to transmit data, other aspects of the transmission medium limit the effectiveness of the increased speed. For example, the "dispersion" effect limits the ability of the service provider to increase the speed of data carried over the fiber-optic cable. The dispersion effect occurs when the light transmitted over the cable broadens out to the point where the information carried by the light is corrupted. To compensate for this effect, conventionally, expensive dispersion compensation circuitry is included in the system. However, in some applications, the expense of this additional circuitry outweighs the benefits of the increased speed of transmission.

For the reasons stated above, and for other reasons stated below which will become apparent to those skilled in the art upon reading and understanding the present specification, there is a need in the art for increased capacity in transmission systems without the use of expensive dispersion compensation circuitry.

SUMMARY

The above mentioned problems with telecommunications and other problems are addressed by embodiments of the present invention and will be understood by reading and studying the following specification. Embodiments of the present invention encode multiple digital data streams into a composite signal using, for example, pulse amplitude modulation and transmitting the composite signal over a fiber-optic link in order to improve the capacity of the link.

More particularly, in one embodiment, an optical communication system is provided. The optical communication system includes an optical fiber, an optical transmitter, and an optical receiver. The optical transmitter is coupled to the optical fiber. The optical transmitter is adapted to encode an optical signal based on at least two, independent input signals. The optical receiver is coupled to the optical fiber. The optical receiver is adapted to decode the optical signal to reproduce the at least two, independent input signals as output signals.

BRIEF DESCRIPTION OF THE DRAWINGS

FIG. 4 is a schematic diagram of an embodiment of a decoder circuit for an optical receiver according to the teachings of the present invention.

FIG. 5 is a graph that illustrates one embodiment for signal levels used by an encoder/decoder in a telecommunications system according to the teachings of present invention.

FIGS. 6A–6G are timing diagrams illustrating an example of the operation of the decoder circuit of FIG. 4.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
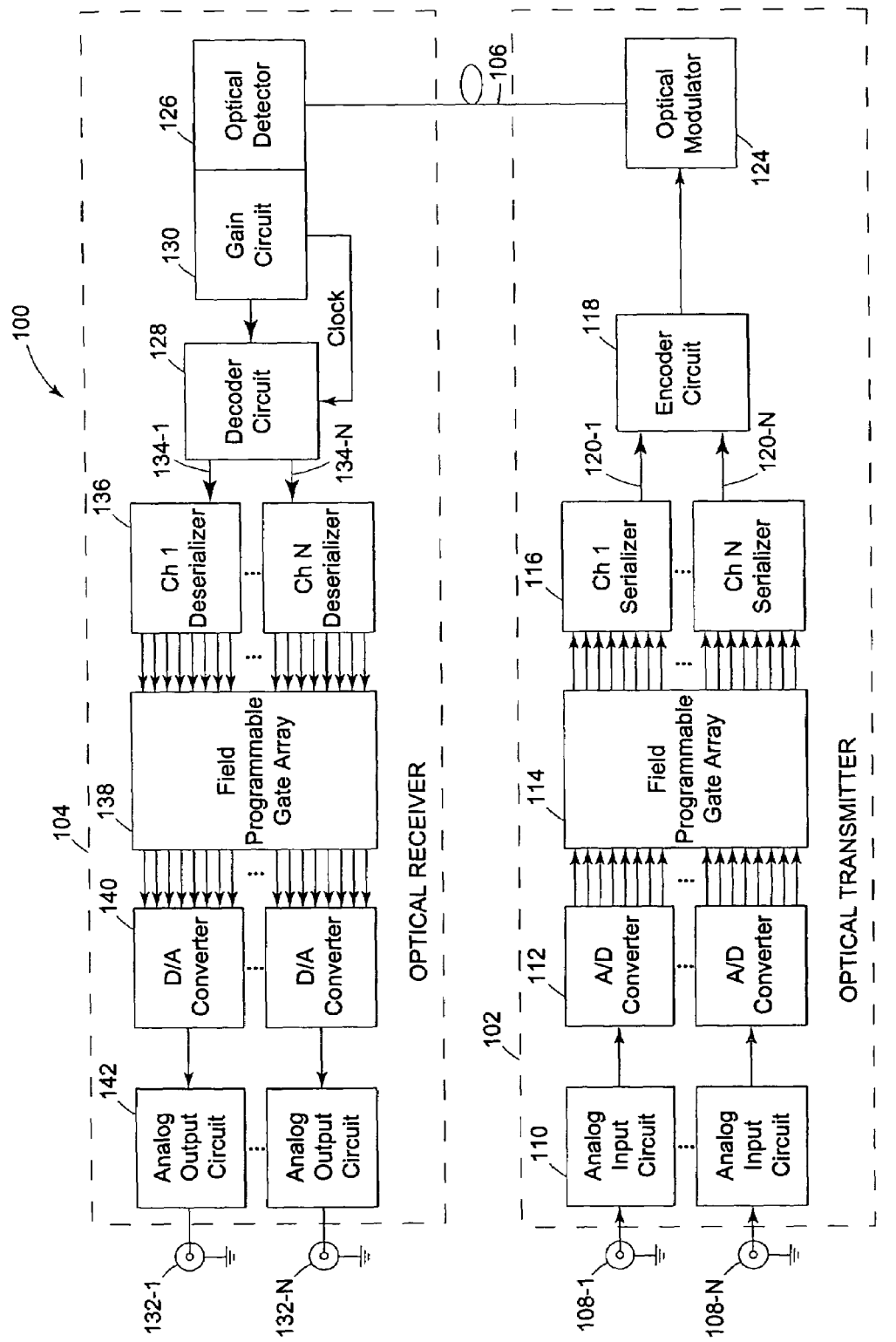
FIG. 1 is a block diagram of an embodiment of a telecommunications system that encodes multiple channels for transmission over a fiber optic link according to the teachings of the present invention.

FIG. 1 is a block diagram of an embodiment of a telecommunications system, indicated generally at 100, that encodes multiple channels for transmission over a fiber optic link according to the teachings of the present invention. System 100 includes optical transmitter 102 that is coupled to optical receiver 104 over fiber-optic link 106. Advantageously, system 100 provides increased capacity over existing systems by allowing multiple analog channels to be encoded and transmitted over a single fiber-optic link 106 without substantial impacts due to increasing dispersion effects and without substantially increasing the speed of transmission. In one embodiment, system 100 uses pulse amplitude modulation to encode the signals from multiple sources as a composite optical signal to be carried over fiber-optic link 106. For purposes of the specification, "pulse amplitude modulation" is a technique in which the amplitude of pulses in the composite optical signal are determined based on values of bits from multiple sources.

Optical transmitter 102 is coupled to receive inputs from plurality of independent, analog data sources at ports 108-1, . . . , 108-N. For example, in one embodiment, optical transmitter 102 is coupled to receive analog RF signals. Optical transmitter 102 includes front-end circuitry for processing the received analog signals. This front-end circuitry is reproduced for each of the inputs at ports 108-1, . . . , 108-N. For simplicity in description, only the front-end circuitry for port 108-1 is described in detail. It is understood that the front-end circuitry for the remaining ports is constructed and operates in a similar manner and thus is not described here.

The front-end circuitry for port 108-1 includes analog input circuit 110, analog to digital (A/D) converter 112, field programmable gate array 114, and serializer 116. Analog input circuit 110 amplifies the input signal and performs Nyquist filtering before providing the signal to A/D converter 112. A/D converter 112 converts the analog input signals from analog input circuit 110 into a corresponding digital signal for application to field programmable gate array 114. Field programmable gate array 114 performs operations such as framing, coding, and scrambling for the digital data. Once processed, the data is provided to serializer 116 to convert the parallel data from field programmable gate array 114 into a serial bit stream.

The front-end circuitry of optical transmitter 102 performs conventional functions to prepare analog signals for digital transmission over an optical link. Thus, portions of the front-end circuitry can be removed or modified as necessary when digital or other types of analog signals are to be transmitted. For example, A/D converters are not necessary if the signals receive at ports 108-1, . . . , 108-N are in the digital domain.

Encoder circuit 118 is coupled to the front-end circuitry of ports 108-1, . . . , 108-N. Thus, encoder circuit 118 receives first and second serial, digital data streams at inputs 120-1, . . . , 120-N. Encoder circuit 118 encodes the bits of the digital, serial data streams into a composite output signal that represents bits from both digital, serial data streams in the same symbol time as the serial data streams. For example, in one embodiment, encoder circuit 118 performs pulse amplitude modulation with four discrete levels for the serial input data streams. In other embodiments, encoder circuit 118 encodes any appropriate number of input data streams into a composite signal with, for example, any appropriate number of signal levels in the composite signal. Optical modulator 124 receives the composite output signal and provides a modulated optical signal for transmission over optical link 106.

Optical receiver 104 receives the composite optical signal over optical link 106 and reproduces the serial, digital signals at output ports 134-1, . . . , 134-N. Optical receiver 104 receives the composite optical signal at optical detector 126. In one embodiment, optical detector 126 comprises a photodiode or other appropriate circuit that converts optical signals to electric signals. Optical detector 126 is coupled to decoder circuit 128 through gain circuit 130. In one embodiment, gain circuit 130 includes an automatic gain control circuit. The automatic gain control circuit assures that the composite peak to peak voltage provided to decoder circuit 128 remains substantially constant over the input dynamic range of optical receiver 104 and under many other operating conditions of system 100. This allows decoder 128 to properly reproduce the input signals for ports 108-1, . . . , 108-N from the received composite signal. Alternatively, in other embodiments, decoder circuit 128 compensates for variations in the peak to peak voltage provided by optical detector 126 when decoding the composite signal.

Gain circuit 130 further includes a clock recovery mechanism that provides a clock signal to decoder circuit 128. This clock recovery mechanism is necessary to extract a clock signal to synchronize with the inputs at ports 108-1, . . . , 108-N for the purpose of outputting time aligned signals at output ports 134-1, . . . , 134-N.

Decoder circuit 128 receives the composite signal from optical detector 126 and gain circuit 130 and reproduces to the original signals received at ports 120-1, . . . , 120-N. Thus, decoder circuit 128 outputs a plurality of independent, serial, digital data streams at outputs 134-1, . . . , 134-N. Each of the outputs 134-1, . . . , 134-N is provided to a respective one of output ports 132-1, . . . , 132-N through appropriate back end circuitry.

Due to the similarity in back end circuitry for ports 132-1, . . . 132-N, only the back end circuitry associated with port 132-1 is described here. It is understood, however, that the back end circuitry associated with the other ports is constructed and operates in a similar manner. The back end circuitry associated with port 132-1 includes deserializer 136, field programmable gate array 138, digital to analog (D/A) converter 140, and analog output circuit 142. Deserializer 136 converts serial data streams from decoder circuit 128 into parallel data for field programmable gate array 138. Field programmable gate array 138 performs selected digital manipulation of the data, e.g., descrambling, decoding, and other appropriate digital processing operations. The output of field programmable gate array 138 is provided to digital to analog converter 140 in which analog output signals are generated based on the digital input from field programmable gate array 138. Analog output circuit 142 further amplifies, filters, and otherwise processes the analog signal for output port 132-1.

Figure 2:
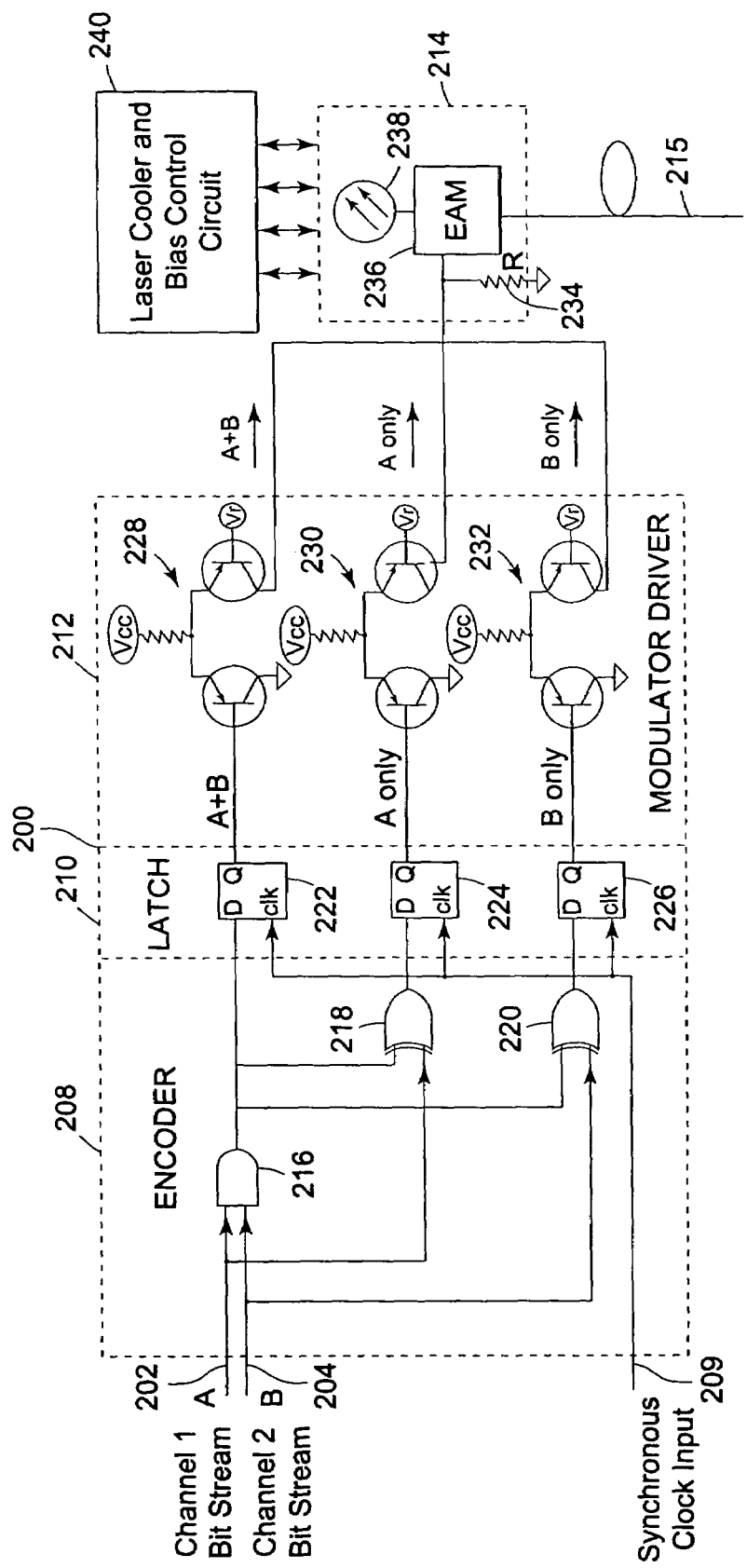
FIG. 2 is a schematic diagram of an embodiment of an encoder circuit for an optical transmitter according to the teachings of the present invention.

FIG. 2 is a schematic diagram of an embodiment of an encoder circuit, indicated generally at 200, for an optical transmitter according to the teachings of the present invention. Encoder circuit 200 receives a plurality of digital, serial data streams and produces a composite output signal based on the digital, serial data streams. The composite output signal is used to drive an optical modulator for transmitting the composite signal over an optical fiber. In this embodiment, encoder circuit 200 receives two digital, serial data streams at inputs 202 and 204 and produces a composite signal for transmission over optical fiber 215. Encoder circuit 200 further includes synchronous clock input 209 that provides a clock reference signal for use in encoding the data received at inputs 202 and 204. In this embodiment, encoder circuit 200 encodes the two input data streams into a composite signal with four output levels based on the signal level of the input signals according to the truth table provided below.

| Input 202 | Input 204 | Level of Composite Signal | Reference Number in FIG. 5 |
|---|---|---|---|
| 0 | 0 | 1 | 500 |
| 0 | 1 | 2 | 502 |
| 1 | 0 | 3 | 504 |
| 1 | 1 | 4 | 506 |

The signal levels of the composite signal are represented graphically in FIG. 5. Encoder circuit 200 achieves the desired output signal level by controlling the current level provided to optical modulator 214.

Encoder circuit 200 includes three main components that generate the output current used to drive optical modulator 214. These components include: encoder 208, latches 210, and modulator driver 212. Encoder 208 comprises a logic circuit that is coupled to receive signals at inputs 202 and 204. In this embodiment, encoder circuit 208 includes AND gate 216, and exclusive-OR gates 218 and 220. AND gate 216 is coupled to inputs 202 and 204. Input 202 is also coupled to one input of exclusive-OR gate 218. Input 204 is also coupled to one input of exclusive-OR gate 220. An output of AND gate 216 is coupled to another input of each of exclusive-OR gates 218 and 220. Encoder 208 provides three output signals. These output signals are provided by AND gate 216, and exclusive-OR gates 218 and 220.

Latches 210 receive the output signals from encoder 208. Specifically, latches 210 comprise a plurality of latches 222, 224, and 226. Each latch comprises a D flip-flop with a clock input coupled to synchronous clock input 209.

Latches 210 are coupled to modulator driver 212. In this embodiment, modulator driver 212 comprises a plurality of current switches 228, 230, and 232. Based on the output of latches 222, 224, and 226, current switches 228, 230, and 232 provide a selected current level to optical modulator 214 to produce output pulses with appropriate amplitudes based on the signals receive at input 202 and 204. In this example, current switch 228 is turned on to provide a current to optical modulator 214 when both input 202 and input 204 receive a logic 1. Further, current switch 230 is turned on to provide a different current level to optical modulator 214 when input 202 is a logic 1 and input 204 is a logic 0. Finally, current switch 232 is turned on to provide their current level to optical modulator 214 when input 202 is a logic 0 and input 204 is a logic 1. When input 202 and input 204 both receive a logic 0, only bias current is provided to optical modulator 214 thus producing a fourth output level.

In one embodiment, optical modulator 214 includes laser 238 and electro-absorptive modulator 236. Optical modulator 214 is further coupled to laser cooler and bias control circuit 240.

The operation of encoder circuit 200 is described with respect to timing diagrams shown in FIGS. 3A–3G. In the timing diagrams, the signals are represented as "return to zero" signals. It is understood, however, that in other embodiment, the input signals to the encoder circuit do not return to zero on each bit.

Figure 3:
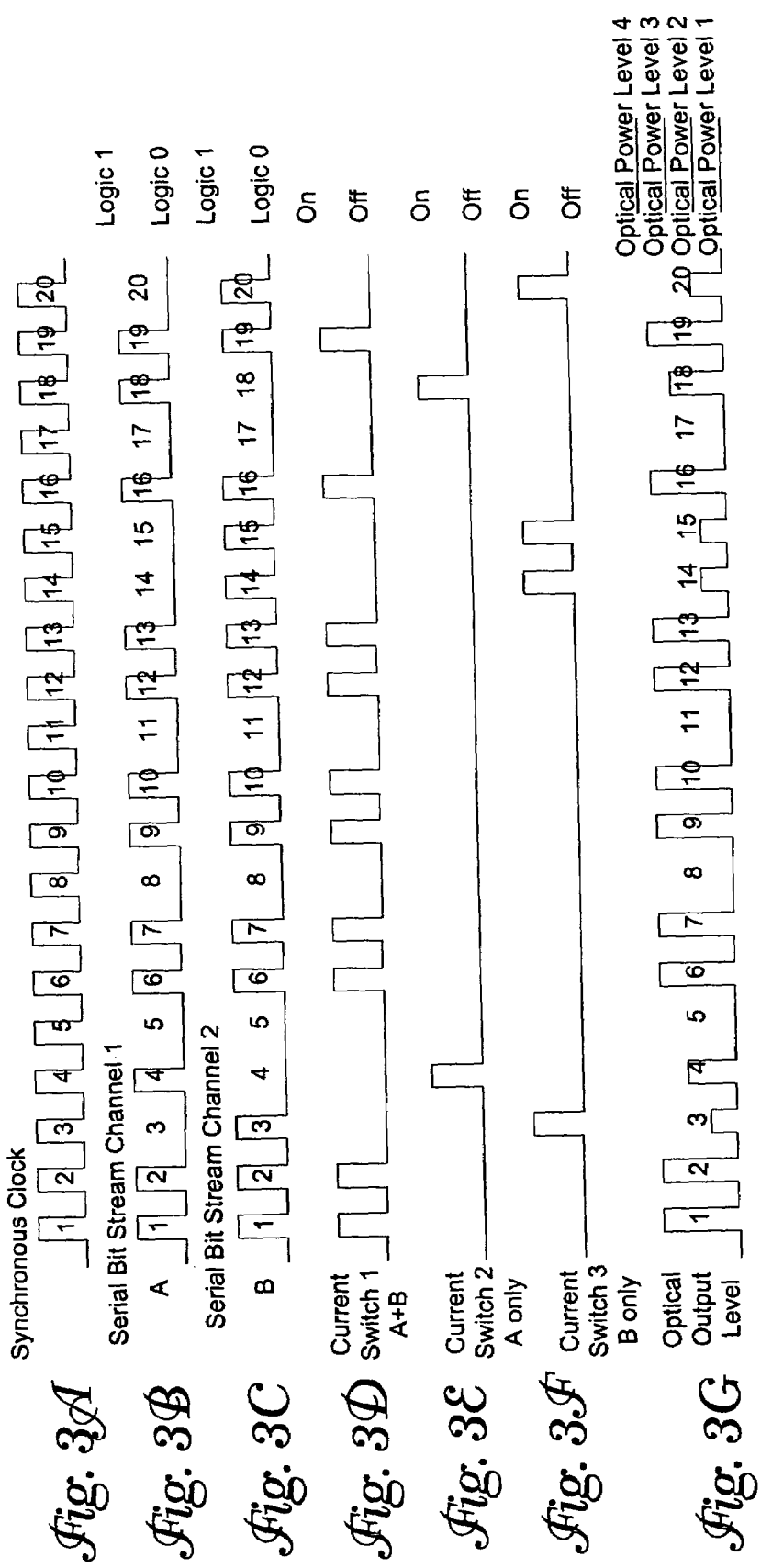
FIGS. 3A–3G are timing diagrams illustrating an example of the operation of the encoder circuit of FIG. 2.

FIG. 3A illustrates a stream of pulses for a synchronous reference clock for use in this example. FIGS. 3B and 3C provide an example of input signals provided to inputs 202 and 204, respectively, of encoder circuit 200. FIGS. 3D, 3E, and 3F illustrate the states of current switches 228, 230, and 232, respectively. Finally, FIG. 3G illustrates the power level of the optical output of optical modulator 214. To describe the operation of encoder circuit 200, an example of each of the possible power output levels in FIG. 3G are provided in turn below.

Optical power level 4 is achieved when both input 202 and input 204 receive a logic 1 as in pulse 1 of this example. In this case, AND gate 216 produces a logic 1 output. This logic 1 output is latched by latch 222 and turns on current switch 228 as indicated in FIG. 3D. It is noted that current switches 230 and 232 are turned off as indicated in FIGS. 3E and 3F. Thus, the current from current switch 228 drives the voltage on the resister 234 and sets the output pulse level of modulator 214 as indicated in pulse 1 of FIG. 3G. In one embodiment, this optical power level corresponds to 0 dB relative attenuation.

Optical power level 3 is achieved when input 202 receives a logic level 1 and input 204 receives a logic 0 as in pulse 4 of this example. In this case, exclusive-OR gate 218 is the only logic gate that produces a logic 1 output. This logic 1 output is latched by latch 224 and turns on current switch 230 as indicated in FIG. 3E. In this case, switches 228 and 232 are both turned off as indicated in FIGS. 3D and 3F. The current from current switch 230 drives the voltage on the resister 234 and sets the output pulse level of modulator 214 as indicated in pulse 4 of FIG. 3G. In one embodiment, this optical power level corresponds to −1.75 dB relative attenuation.

Optical power level 2 is achieved when input 202 receives a logic level 0 and input 204 receives a logic 1 as in pulse 3 of this example. In this case, exclusive-OR gate 220 is the only logic gate that produces a logic 1 output. This logic 1 output is latched by latch 226 and turns on current switch 232 as indicated in FIG. 3F. In this case, switches 228 and 230 are both turned off as indicated in FIGS. 3D and 3E. The current from current switch 232 drives the voltage on the resister 234 and sets the output pulse level of modulator 214 as indicated in pulse 3 of FIG. 3G. In one embodiment, this optical power level corresponds to −4.75 dB relative attenuation.

Optical power level 1 is achieved when input 202 receives a logic level 0 and input 204 receives a logic 0 as in pulse 5 of this example. In this case, none of the logic gates produce a logic 1 output. Thus, all of the current switches 228, 230, and 232 are turned off as indicated in FIGS. 3D, 3E, and 3F. The fixed, low level bias current drives the voltage on the resister 234 and sets the output pulse level of modulator 214 as indicated in pulse 5 of FIG. 3G. In one embodiment, this optical power level corresponds to −15 dB relative attenuation.

FIG. 4 is a schematic diagram of an embodiment of a decoder circuit, indicated generally at 400, for an optical receiver according to the teachings of the present invention. Decoder circuit 400 receives a composite optical signal and reproduces a plurality of digital, serial data streams from the composite signal. The composite input signal is received over optical fiber 402. In this embodiment, decoder circuit 400 produces two digital, serial data streams at outputs 404 and 406. Decoder circuit 400 decodes a composite signal with four output levels into the two independent serial, data streams at outputs 404 and 406. It is understood that in other embodiments other appropriate encoding/decoding schemes are used to allow any appropriate number of independent, serial, digital data streams to be reproduced from a composite signal.

Decoder circuit 400 receives the composite signal from fiber optic cable 402 through optical receiver 408 and amplifier 414. Optical receiver 408, in one embodiment, includes photodiode 410 and preamplifier 412. Preamplifier 412 has a gain that is selected to keep the operation linear over the full input dynamic range. Preamplifier 412 is coupled to amplifier 414. Amplifier 414 is coupled to input 415 of decoder circuit 400. In one embodiment, automatic gain control circuit 416 is coupled to selectively adjust the gain of amplifier 414. In practice, automatic gain control circuit 416 attempts to maintain the peak-to-peak voltage of the composite signal into input 415 at substantially a constant level. Input 415 is also provided to clock recovery circuit 418. Clock recovery circuit 418 derives a clock signal from the composite signal. This clock signal is provided as another input to decoder circuit 400 at 417. Decoder circuit 400, in one embodiment, includes three stages. Each of these stages is discussed in turn below.

Decoder circuit 400 includes a plurality of comparators 420. In this example, decoder circuit 400 includes three comparators 426, 428, and 430, respectively, in order to detect the four possible levels of the composite input signal. In other embodiments, an appropriate number of comparators is used to allow decoder circuit 400 to discern properly between the various levels of the composite input signal to allow the original signals to be reproduced at outputs 404 and 406. Each of the comparators 426, 428, and 430 are implemented as D flip-flops with the $\overline{D}$ input coupled to a reference voltage. For example, comparator 430 is coupled to the reference voltage V3, comparator 428 is coupled to the reference voltage V2 and the comparator 426 is coupled to reference voltage V1. The reference voltages are established by a plurality of resistors R1, R2, R3, and R4 that are coupled between Vcc and ground. FIG. 5 demonstrates the relationship between the reference voltages, V1, V2, and V3, and the voltage levels used for encoding data, namely, levels 500, 502, 504, and 506.

Decoder circuit 400 also includes decoder 422. Decoder 422 is a logic circuit that, in this embodiment, includes three logic gates. Decoder 422 includes AND gate 432 and exclusive-OR gates 434 and 436. AND gate 432 is coupled to the Q output of each of comparators 428 and 430. Exclusive-OR gate 434 is also coupled to the Q output of each of comparators 428 and 430. Exclusive-OR gate 436 is coupled to the Q output of comparator 426 and to the output of exclusive-OR gate 434. The output of exclusive-OR gate 436 and the output of AND gate 432 provide the outputs for decoder 422.

Decoder circuit 400 further includes latches 424 which provide the output for decoder circuit 400. Latches 424 include first and second D flip-flops 438 and 440. The clock input of each of D flip-flops 438 and 440 are coupled to the recovered clock signal at input 417. First D flip-flop 438 is coupled to the output of exclusive-OR gate 436. Similarly, second D flip-flop 440 is coupled to the output of AND gate 432. Flip-flops 438 and 440 are coupled to outputs 404 and 406, respectively, of decoder circuit 400.

The operation of decoder circuit 400 is described with respect to an example provided in FIGS. 6A–6G. In the timing diagrams, the signals are represented as "return to zero" signals. It is understood, however, that in other embodiment, the bits of the serial, digital data streams do not return to zero on each bit.

FIG. 6A illustrates a stream of pulses for a recovered reference clock for use in this example. FIG. 6B provides an example of a composite signal output from an optical detector. FIGS. 6C, 6D and 6E illustrate the outputs of comparators 426, 428, and 430, respectively. Finally, FIGS. 6F and 6G illustrate the serial, digital data streams reproduced from the composite signal at outputs 404 and 406, respectively. To describe the operation of decoder circuit 500, an example of each of the possible power input levels in FIG. 6B are provided in turn below.

An optical power level 4 corresponding to a logic 1 at both outputs 404 and 406 is shown for example with respect to pulse 1 in the composite signal of FIG. 6B. When a pulse of level 4 is received, all of the comparators 426, 428, and 430 provide high logic level output signals. With two logic 1 inputs, AND gate 432 produces a logic 1 output and thus output 406 is a logic 1. Further, with both of the inputs to exclusive-OR gate 434 at logic 1, exclusive-OR gate 434 outputs a logic 0. Exclusive-OR gate 436 receives a logic 0 from exclusive-OR gate 434 and a logic 1 from comparator 426. Thus, output 404 is also a logic 1.

An optical power level 3 corresponding to a logic 0 at output 404 and a logic 1 at output 406 is shown for example with respect to pulse 4 in the composite signal of FIG. 6B. When a pulse of level 3 is received, comparators 428 and 430 provide a high logic level output signal and comparator 426 provides a logic 0 as shown in FIGS. 6D, 6E, and 6C, respectively. With two logic 1 inputs, AND gate 432 produces a logic 1 output and thus output 406 is a logic 1. Further, with both of the inputs to exclusive-OR gate 434 at logic 1, exclusive-OR gate 434 outputs a logic 0. Exclusive-OR gate 436 receives a logic 0 from exclusive-OR gate 434 and a logic 0 from comparator 426. Thus, output 404 is also a logic 0.

An optical power level 2 corresponding to a logic 1 at output 404 and a logic 0 at output 406 is shown for example with respect to pulse 3 in the composite signal of FIG. 6B. When a pulse of level 2 is received, comparator 430 provides a logic 1 output signal and comparators 426 and 428 provide a logic 0 as shown in FIGS. 6E, 6C, and 6D, respectively. With one logic 1 input, AND gate 432 produces a logic 0 output and thus output 406 is a logic 0. Further, with one of the inputs to exclusive-OR gate 434 at logic 1, exclusive-OR gate 434 outputs a logic 1. Thus, exclusive-OR gate 436 receives a logic 1 from exclusive-OR gate 434 and a logic 0 from comparator 426. Thus, output 404 is also a logic 1.

An optical power level 1 corresponding to a logic 0 at output 404 and a logic 0 at output 406 is shown for example with respect to pulse 5 in the composite signal of FIG. 6B. When a pulse of level 1 is received, comparators 426, 428 and 430 provide logic 0 output signals as shown in FIGS. 6C, 6D, and 6E, respectively. With two logic 0 inputs, AND gate 432 produces a logic 0 output and thus output 406 is a logic 0. Further, with both of the inputs to exclusive-OR gate 434 at logic 0, exclusive-OR gate 434 outputs a logic 0. Thus, exclusive-OR gate 436 receives a logic 0 from exclusive-OR gate 434 and a logic 0 from comparator 426. Thus, output 404 is also a logic 0.

Although specific embodiments have been illustrated and described in this specification, it will be appreciated by those of ordinary skill in the art that any arrangement that is calculated to achieve the same purpose may be substituted for the specific embodiment shown. This application is intended to cover any adaptations or variations of the present invention. For example, other techniques for encoding multiple streams of data into a composite signal can be used in place of pulse amplitude modulation, e.g., coding techniques which use M signal levels for N inputs wherein M can equal N. Further, other voltage levels, signal levels and numbers of bit streams can be used.

What is claimed is:

1. A method for decoding a plurality of serial, digital data streams from an optical signal, the method comprising:
   receiving the optical signal, wherein the optical signal is a pulse amplitude modulated signal;
   converting the optical signal to an electrical signal;
   comparing the electrical signal with a plurality of levels;
   producing comparison output signals based on the comparison of the electrical signal with the plurality of levels;
   logically decoding the comparison outputs to produce decoder outputs; and
   latching the decoder outputs signals on a clock signal to generate the plurality of serial, digital data streams.

2. The method of claim 1, and further comprising selectively adjusting the peak to peak level of the electrical signal prior to comparing.

3. The method of claim 1, wherein comparing the electrical signal with a plurality of levels comprises comparing the electrical signal with N levels for M serial, digital data streams.

4. The method of claim 1, wherein comparing the electrical signal with a plurality of levels comprises comparing the electrical signal with $2^M-1$ levels for M serial, digital data streams.

5. The method of claim 1, wherein comparing the electrical signal with a plurality of levels comprises comparing the electrical signal with M levels for M serial, digital data streams.

6. A method of processing an optical signal;
receiving a pulse amplitude modulated optical signal from an optical fiber;
producing an electrical signal having selected levels based on the pulse amplitude modulated signal;
comparing the electrical signal with at least one selected level;
producing a first and at least one additional serial, digital data streams based on the comparing the electrical signal with at least the one selected level;
logically decoding the first and at least one additional serial, digital data streams; and
latching the decoded first and the at least one additional serial, digital data streams to a first and at least one additional output.

7. The method of claim 6, further comprising:
maintaining a substantially constant peak to peak level of the electrical signal.

8. The method of claim 6, wherein comparing the electrical signal with at least one selected level further comprises:
comparing the electrical signal with an adaptive reference level that is based on peak to peak variations in the electrical signal.

9. The method of claim 6, wherein comparing the electrical signal with at least one selected level further comprises:
comparing the electrical signal with a plurality of signals.

10. The method of claim 6, wherein comparing the electrical signal with at least one selected level further comprises:
comparing the electrical signal with N levels for M serial, digital data streams.

11. The method of claim 6, wherein comparing the electrical signal with at least one selected level further comprises:
comparing the electrical signal with $2^M-1$ levels for M serial, digital data streams.

12. The method of claim 6, wherein comparing the electrical signal with at least one selected level further comprises:
comparing the electrical signal with M levels for M serial, digital data streams.

* * * * *